(12) United States Patent
Glasser et al.

(10) Patent No.: US 7,337,223 B2
(45) Date of Patent: *Feb. 26, 2008

(54) SYSTEM AND METHOD FOR ACTIVITY MONITORING AND REPORTING IN A COMPUTER NETWORK

(75) Inventors: Daniel S. Glasser, Seattle, WA (US); Stephen M. Liffick, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 615 days.

This patent is subject to a terminal disclaimer.

(21) Appl. No.: 10/994,039

(22) Filed: Nov. 19, 2004

(65) Prior Publication Data

US 2005/0108392 A1    May 19, 2005

Related U.S. Application Data

(63) Continuation of application No. 10/629,954, filed on Jul. 29, 2003, which is a continuation of application No. 10/327,384, filed on Dec. 20, 2002, now Pat. No. 6,631,412, which is a continuation of application No. 09/359,337, filed on Jul. 21, 1999, now Pat. No. 6,519,639.

(51) Int. Cl.
    *G06F 15/16* (2006.01)
(52) U.S. Cl. .................................. 709/224; 709/204
(58) Field of Classification Search ........ 709/200–205, 709/217–227
    See application file for complete search history.

(56) References Cited

U.S. PATENT DOCUMENTS

| | | | |
|---|---|---|---|
| 5,987,401 A * | 11/1999 | Trudeau | 704/2 |
| 6,260,148 B1 | 7/2001 | Aggarwal et al. | 713/201 |
| 6,288,715 B1 | 9/2001 | Bain et al. | 345/211 |
| 6,292,769 B1 * | 9/2001 | Flanagan et al. | 704/3 |
| 6,301,609 B1 | 10/2001 | Aravamudan et al. | 709/207 |
| 6,339,754 B1 * | 1/2002 | Flanagan et al. | 704/2 |
| 6,519,639 B1 | 2/2003 | Glasser et al. | 709/224 |

* cited by examiner

*Primary Examiner*—Moustafa Meky
(74) *Attorney, Agent, or Firm*—Woodcock Washburn LLP

(57) ABSTRACT

A system for monitoring user activity in an instant messaging session on a computer network periodically sends an activity message to other participants in the instant messaging session if the user has actively entered data during a first predetermined time interval. The system periodically sends a new activity message at intervals corresponding to the first predetermined time interval so long as the user is actively entering data during each time interval. If the user has not entered data during the first predetermined time interval, the system will not send an activity message. Other participants in the instant messaging session receive the activity message and generate an activity indicator on their respective displays. The computer receiving the activity message displays an activity indicator on the computer display in response to receipt of an activity message and starts a timer to measure a second predetermined time interval. If another activity message is not received within the second predetermined time interval, the activity indicator is deleted from the display.

3 Claims, 6 Drawing Sheets

SYSTEM AND METHOD FOR ACTIVITY MONITORING AND REPORTING IN A COMPUTER NETWORK

CROSS-REFERENCE TO RELATED APPLICATIONS

This is a continuation of U.S. patent application Ser. No. 10/629,954, entitled "System and Method for Activity Monitoring and Reporting in a Computer Network," filed on Jul. 29, 2003, which is a continuation of U.S. patent application Ser. No. 10/327,384, now U.S. Pat. No. 6,631,412 entitled "System and Method for Activity Monitoring and Reporting in a Computer Network," filed on Dec. 20, 2002, which is a continuation of U.S. patent application Ser. No. 09/359,337, now U.S. Pat. No. 6,519,639, entitled "System and Method for Activity Monitoring and Reporting in a Computer Network," filed on Jul. 21, 1999.

TECHNICAL FIELD

The present invention is related generally to computer networks and, more particularly, to a system and method for monitoring user activity and reporting the same in a computer network.

BACKGROUND OF THE INVENTION

Computer networks, such as the Internet, are extensively used for storage and retrieval of a vast reservoir of information. Person-to-person communication, in the form of electronic mail (e-mail), has also become widely accepted as a replacement for conventional mail and facsimile. Any individual who has access to the Internet can establish an e-mail account and communicate with other individuals on the Internet.

A new form of e-mail communication, known as instant messaging, is gaining popularity among users of the Internet. As shown in a recent popular movie, "You've Got Mail," two individuals can engage in an ongoing electronic communication without the need for entering the message recipient's e-mail address for each individual transmission. The advantage of instant messaging is that two or more individuals may engage in an ongoing electronic "chat" by simply typing the message on the keyboard and pressing the "Enter" button on the computer keyboard or by clicking on a "Send" icon on the computer display screen.

Unlike telephonic communication, when participants know that a person is speaking, participants in an instant messaging session do not know that somebody is preparing a message for transmission. Without a cue that the other person is transmitting information, it is difficult to have a smooth conversational flow. One mechanism that addresses this problem is employed by a UNIX "talk" program, which performs a character-by-character transmission of an instant message. That is, each time individual types of a single character on the computer keyboard, that character is transmitted to all other participants in the instant messaging session. Because other participants are essentially watching the person type, there are clear cues that a user is "talking."

However, this approach has several limitations. First, character-by-character transmission greatly increases the flow of network traffic because each character requires one or more data packets to be sent to each participant in the instant messaging session. In addition, many users do not like to be "watched" as they type, as their typing errors and incomplete thoughts are transmitted before they can be corrected. Finally, message recipients are often distracted by watching the flickering screen in which characters appear one time as a complete message is formed. Therefore, it can be appreciated that there is a significant need for a system and method that will provide the desired notification of user activity in a computer network. The present invention provides this, and other advantages, as will be apparent from the following detailed description and accompanying figures.

SUMMARY OF THE INVENTION

The present invention is embodied in a system and method for detecting user operation of a user input device and providing an activity notification to other computers in a computer network. This is particularly useful in an instant messaging session where two or more participants may be preparing messages for other participants in the instant messaging session. The system comprises a user input device, such as a keyboard, microphone, mouse, or the like, and an activity monitor to detect user activation of the user input device. The activity monitor will generate a signal indicative of user activation of the input device. A timer measures a first predetermined time interval and, if user activity is detected within the first predetermined time interval, a message processor generates an activity message at the end of the first predetermined time interval and transmits the activity message to at least one recipient with whom the user is communicating via the computer network.

When the user initially activates the user input device to begin composing a message, the activity message processor can immediately send an activity message without waiting for the expiration of the first predetermined time interval. So long as user activity continues to occur in each subsequent first predetermined time interval, an activity message is sent to the at least one recipient at the end of each time interval. If no user activity occurs during a particular time interval, the activity message processor will not send an activity message at the end of that time interval. If the user subsequently begins activity on the user input device again, the activity message processor can send an immediate activity message or, alternatively, wait for the expiration of the first predetermined time interval to send the activity message.

The recipient receives and processes the activity message to thereby generate an activity indicator, which may be conveniently displayed on the computer display. The activity indicator may be in the form of a textual status message, a graphical icon, or a combination of the two. In this manner, the user of the recipient machine is aware that another individual is actively preparing a message for transmission via the computer network.

Since the activity message is only transmitted when a user is actively operating the user input device, the recipient computer must have a way of determining when some other user is no longer active. The recipient computer uses a timer to measure a second predetermined time interval. In one embodiment, the second predetermined time interval is longer than the first predetermined time interval. If an activity message is not received within the second predetermined time interval, the recipient machine can delete the activity indicator from the display, thereby providing the user of the recipient computer with an indication that the other participant is no longer actively entering data on their user input device. In this manner, the recipient machine does not rely on any status message indicating nonactivity, but simply presumes that a nonactive status is appropriate if a subsequent activity message is not received. This technique also minimizes processing of activity messages by the recipient computer since only the first activity message need result in a display of the activity indicator. If subsequent activity messages are received within the second predetermined time interval, the recipient computer does not need to alter the display to indicate the continued active status. If the activity message is not received within the second predetermined time interval, the recipient computer can delete the status indicator from the display. Alternatively, the message sender can define the second predetermined time interval by sending data within the text message and/or the activity message. This programmability allows the sender to alter the predetermined time period.

DETAILED DESCRIPTION OF THE INVENTION

Figure 1:
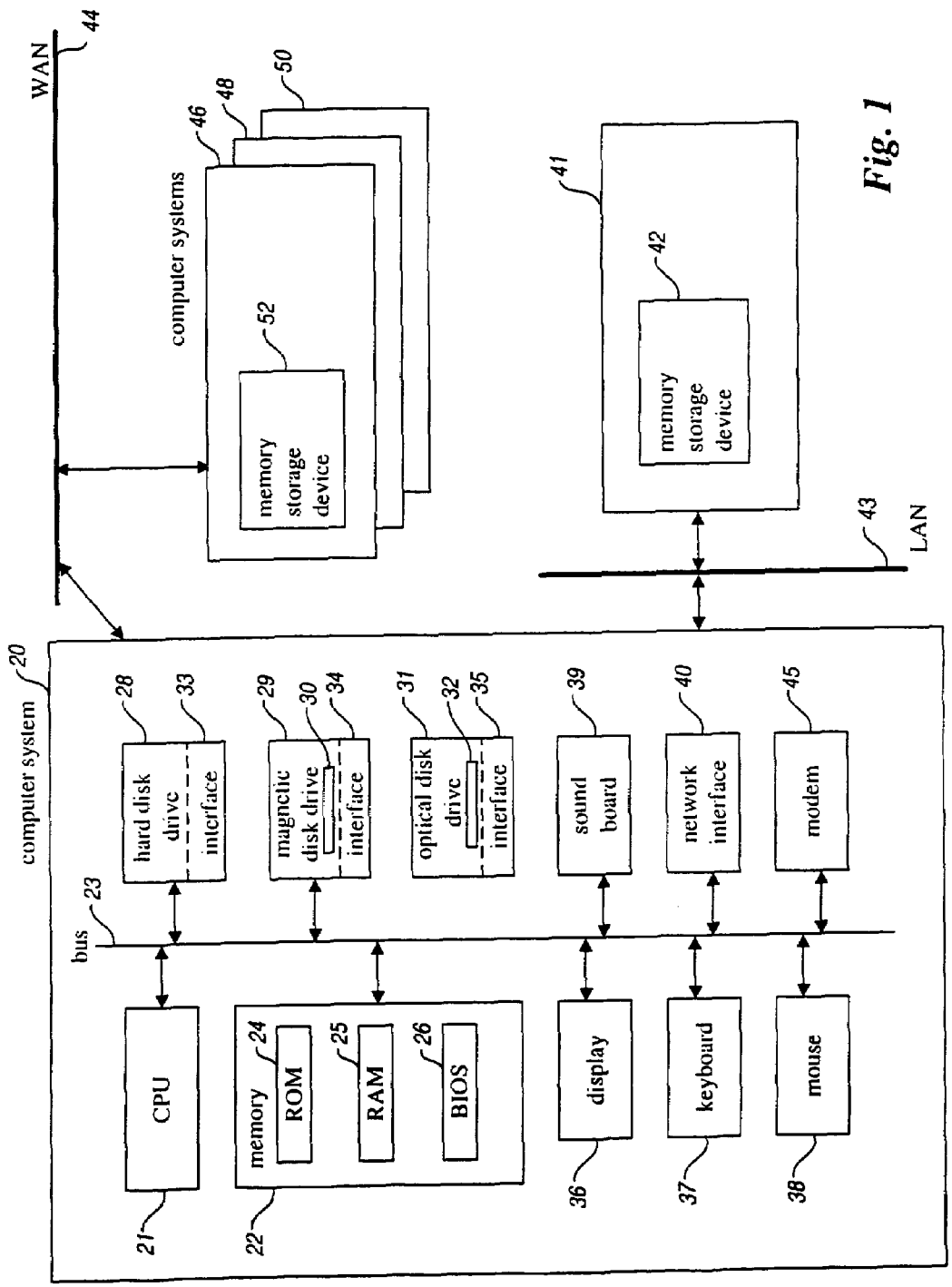
FIG. 1 illustrates a computer system that includes components to implement the system of the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a central processing unit (CPU) 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output system 26 (BIOS), containing the basic routines that helps to transfer information between elements within the personal computer 20, such as during start-up, may be stored in ROM 24.

The personal computer 20 further includes input/output devices 27, such as a hard disk drive 28 for reading from and writing to a hard disk, not shown, a magnetic disk drive 29 for reading from or writing to a removable magnetic disk 30, and an optical disk drive 31 for reading from or writing to a removable optical disk 32 such as a CD ROM or other optical media. The hard disk drive 28, magnetic disk drive 29, and optical disk drive 31 are connected to the system bus 23 by a hard disk drive interface 33, a magnetic disk drive interface 34, and an optical drive interface 35, respectively. The drives and their associated computer-readable media provide nonvolatile storage of computer readable instructions, data structures, program modules and other data for the personal computer 20. Although the exemplary environment described herein employs a hard disk, a removable magnetic disk 30 and a removable optical disk 32, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment. Other I/O devices 27, such as a display 36, keyboard 37, mouse 38, sound board 39 may be included in the personal computer 20 and operate in a known manner. Still other I/O devices 27, such as a joystick, speakers and the like may also be included in the personal computer 20. For the sake of brevity, these components are not illustrated in FIG. 1.

The personal computer 20 may also include a network interface 40 to permit operation in a networked environment using logical connections to one or more remote computers, such as a remote computer 41. The remote computer 41 may be another personal computer, a server, a router, a network PC, a peer device or other common network node, and typically includes many or all of the elements described above relative to the personal computer 20, although only a memory storage device 42 has been illustrated in FIG. 1. The logical connections depicted in FIG. 1 include a local area network (LAN) 43 and a wide area network (WAN) 44. Such networking environments are commonplace in offices, enterprise-wide computer networks, intranets and the Internet.

When used in a LAN networking environment, the personal computer 20 is connected to the LAN 43 through the network interface 40. When used in a WAN networking environment, the personal computer 20 typically includes a modem 45 or other means for establishing communications over the WAN 44, such as the Internet. The modem 45, which may be internal or external, permits communication with remote computers 46-50. In a networked environment, program modules depicted relative to the personal computer 20, or portions thereof, may be stored in the remote memory storage device 42 via the LAN 51 or stored in a remote memory storage device 52 via the WAN 44. It will be appreciated that the network connections shown are exemplary and other means of establishing a communications link between the computers may be used.

Figure 2:
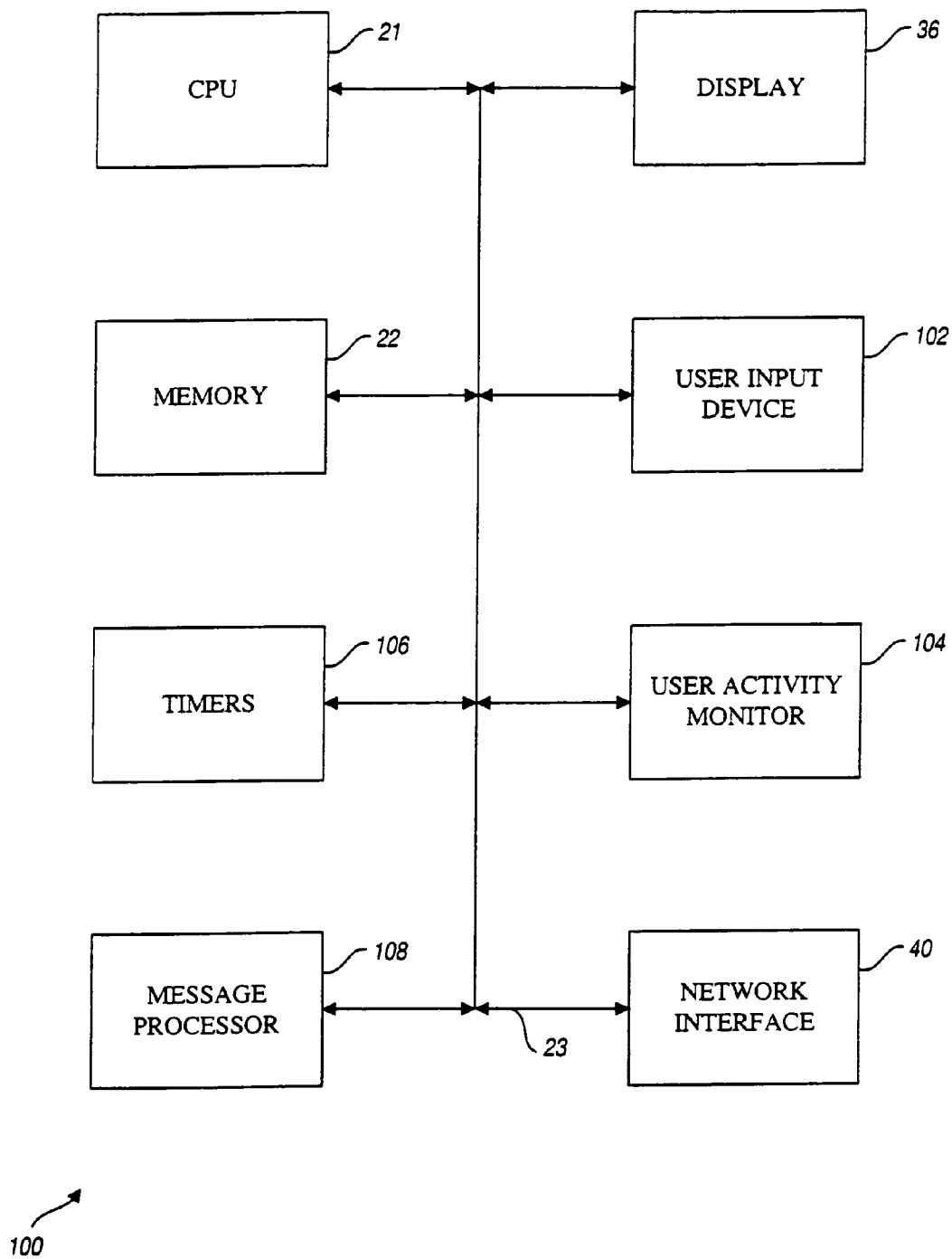
FIG. 2 is a functional block diagram of computer system components used to implement the system of the present invention.

The present invention is embodied in the system 100 illustrated in the functional block diagram of FIG. 2. For the sake of clarity, some components illustrated in FIG. 1 are not shown in FIG. 2 because they do not relate directly to the implementation of the system 100. Some components illustrated in FIG. 2 are actually implemented by a series of instructions stored in the system memory 22 and executed by the CPU 21. However, for the sake of clarity, each of these components is illustrated as a separate block into block diagram because each performs a separate function.

In addition to the CPU 21 and the system memory 22, the system 100 includes the display 36 and network interface 40, which are all coupled together by the system bus 23. The system 100 can use the modem 45 (see FIG. 1) in place of or in addition to the network interface 40. However, for the sake of brevity, the present description will refer to the network interface 40. In addition to these components, the system 100 includes a user input device 102, such as the keyboard 37. However, as will be described below, the user input device 102 may take other forms, such as the mouse 38 or an audio input device 122 (see FIG. 3) coupled to the sound board 39 and speech recognition software program.

A user activity monitor 104 detects user operation of the user input device 102 and generates signals in response thereto. A timer 106 operates in conjunction with the user activity monitor 104 to measure a time period since the last user activity. A typical computer 20 (see FIG. 1) includes several timers, which may be part of the CPU 21. The use of one or more timers 106 in the system 100 is described in greater detail below. The programming instructions to operate the timers 106 to measure one or more predetermined time periods is well known and need not be described herein.

A message processor 108 forms one or more data packets for transmission on the LAN 43 (see FIG. 1) or WAN 44 using the network interface 40. The message processor 108 may send user-entered data, such as a message typed in by the user on the keyboard 37. The formation of data packets to send text messages over a computer network is within the knowledge of one skilled in the art in need not be described in greater detail herein. In addition, the message processor 108 transmits user activity messages via the network interface 39. The formation of activity messages and content thereof will be described in greater detail below.

The message processor 108 also processes data packets received from a remote computing platform. For example, the message processor 108 receives and processes data packets received from another participant in an instant messaging session, including text messages and activity messages. The operation of the message processor 108 to receive and process text messages is known to those skilled in the art and need not be described in detail herein. The operation of the system 100 for received activity messages will be described in greater detail below.

The system 100 monitors user activity during the instant messaging session and sends periodic activity messages to other participants in the instant messaging session. In one embodiment, the timer 106 measures a first predetermined time period and, if user activity of the user input device 102 occurred within the first predetermined time period, the message processor 108 automatically generates an activity message and transmits it to the other participants in the instant messaging session. Thus, each participant in the instant messaging session is aware that another participant is actively communicating. For example, the timer 106 can measure five second intervals. During each five second interval, the user activity monitor 104 monitors the user input device 102 and detects user at operation or activation thereof. If user activity occurred within the five second interval, the message processor 108 will generate an activity message and transmit it over the network interface 40 to each participant in the instant messaging session.

The user activity monitor 104 is typically a series of computer instructions stored in the system memory 22 and executed by the CPU 21. One example of a user activity monitor is a computer screen saver, which blanks or otherwise alters data for the display 36 if the user does not activate the keyboard 37 or the mouse 38 for some predetermined delay time, such as, by way of example, ten minutes. Each time the screen saver program detects user activity, it resets the timer. The primary difference between the user activity monitor 104 and a screen saver program is it that the time period measured by the timer 106 is generally much shorter than the typical screen saver delay time. Screen saver programs form no part of the present invention, but are described as an example of a technique for monitoring keyboard activity. The user activity monitor 104 may be implemented using similar monitoring techniques, but for a shorter time interval, such as five seconds. However, the user activity monitor 104 does not alter data for the display 36 if no activity occurs within the five second time interval. Rather, the message processor 108 does nothing if no activity occurs within the five second time interval and generates an activity message if activity does occur within the five second time interval. The user activity monitor 104 may also be implemented using hardware interrupts wherein the user activity monitor detects the generation of interrupts from I/O devices, such as the keyboard 37 or mouse 38. Similarly, the user activity monitor 104 can monitor user activity on input devices, such as a joystick (not shown) or the audio input device 122 (see FIG. 3) of a multi-media board, such as the sound board 39.

As noted above, the message processor 108 will generate and transmit an activity message if user activity was detected during the last time interval measured by the timer 106. If no user activity was detected during the last time interval, the message processor 108 will not generate an activity message. Thus, the system 100 does not create excessive network traffic by transmitting a data packet corresponding to each character typed by the user, but only periodically sends an activity message indicating that the user is actively operating user input device 102.

The user enters data with the user input device 102 (e.g., the keyboard 37) to form a message for transmission. The data entered by the user is stored in a buffer, which is typically part of the memory 22. The user can terminate data entry and cause the message processor 108 to form data packets and transmit the message by activating a selected control on the user input device 102. For example, if user input device is the keyboard 37, the user types in the desired message and presses the "Enter" key on the keyboard. Alternatively, the user may terminate the message input mode and transmit the text message by manipulating the mouse 38 to position a cursor (not shown) on a "Send" button on the display 36.

Once a text message has been transmitted, the message processor 108 will not transmit additional activity messages until the user once again activates the user input device 102 to generate another text message. If the data entered by the user is the start of a text message, the message processor 108 can generate and transmit an activity message immediately rather than wait for the time interval measured by the timer 106 to expire. For example, the message processor 108 can generate an activity message the first time the user activates the keyboard 37 to type a message. Thus, the system can provide an immediate activity message when the user begins to enter a message (via the user input device 102) and will subsequently send a periodic activity messages at the end of time interval measured by the timer 106 so long as user activity occurred during the last time interval. Similarly, the message processor 108 can immediately send an activity message if the user has entered a partial text message into the buffer and then stopped entering data for some time greater than the first predetermined time interval and subsequently enters additional data into the buffer.

The activity message itself is transmitted in a conventional email form using the multipurpose Internet mail extensions (MIME) format. The activity message has the following form:

| MIME-Version: | 1.0 |
| Content-Type: | text/x-msmsgscontrol |
| TypingUser: | <name of sending user> |
| <blank line> | |
| <blank line> | |

The text message itself is also transmitted in a conventional email form using the MIME format. The text message has the following form:

| MIME-Version: | 1.0 |
| Content-Type: | text/plain; charset=UTF-8 |
| To: | <name of receiving users> |
| <blank line> | |
| <message body> | |

Each recipient receives and processes the activity messages and text messages. The text messages are processed in a conventional fashion and need not be described in greater detail herein. The activity messages are processed to indicate to each recipient that one or more participants in the instant messaging session are actively entering data via their respective user input devices 102.

Figure 3:
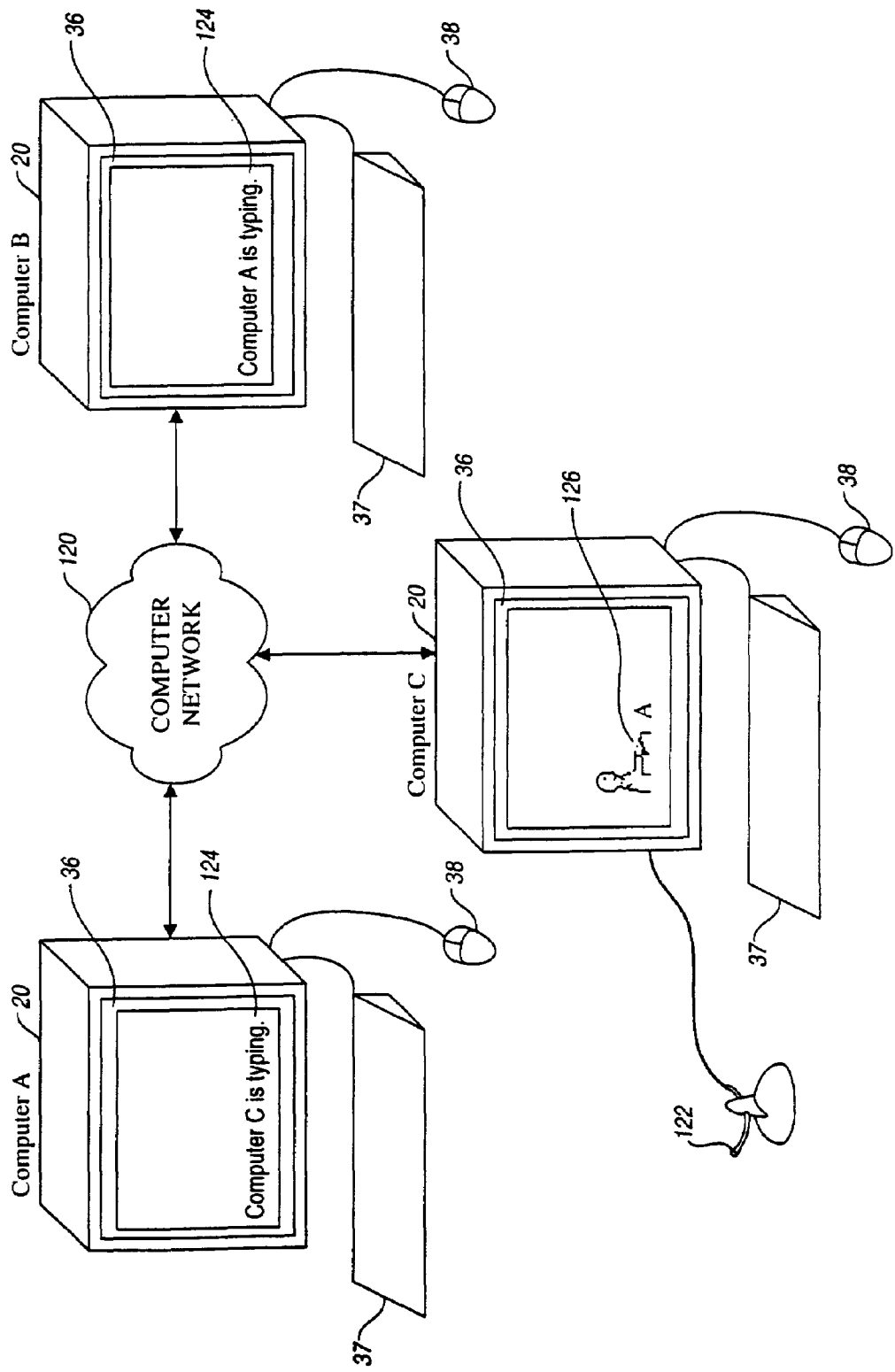
FIG. 3 is a functional block diagram illustrating the operation of the system of FIG. 2 for multiple participants in instant messaging session.

FIG. 3 illustrates an instant messaging session between three participants. It should be understood that each participant in the instant messaging session has a computer platform containing the components illustrated in the FIG. 2. FIG. 3 illustrates three computers 20, identified as Computers A-C, which are each coupled to a computer network 120, such as the Internet. As those skilled in the art can appreciate, the Computers A-C can be coupled to the computer network 120 by a variety of means, such as the modem 45 (see FIG. 1), network connections such as an Ethernet connection, or any other conventional network connection. It is further noted that the Computers A-C need not have the same type of network connection. For example, the Computer A may be connected to the computer network 120 via the modem 45 within the computer system 20, while the computer C may be coupled to the computer network by high-speed network connection, such as an Ethernet connection.

For purposes of the following discussion, it is assumed that the users of the Computers A-C are coupled to the computer network 120 and engaged in an instant messaging session. In accordance with the principles of the present invention, if one or participant (e.g., the user of computer A) enters text message data using the keyboard 37, the system 100 within that computer (e.g., the Computer A) will generate an activity message and transmit it to the other computers in the instant messaging session (e.g., the Computers B-C). If the user of the Computer C is also typing a message on the keyboard 37, an activity message will be generated by the system 100 within the Computer C and transmitted to the Computers A-B.

It should be noted that the Computer C also includes an audio input device 122, such as a microphone, coupled to one of the input/output devices 27 (see FIG. 1), such as the sound board 39 or other multimedia interface (not shown). In this example, the user of the Computer C can enter user data for a message using the keyboard 37 or the microphone 122. The audio data can be converted into text data by a conventional voice recognition software program and transmitted as text data. Alternatively, the message processor 108 can create data packets for the audio data and transmit audio data instead of text data. In either event, the user entry of data is detected by the user activity monitor 104 (see FIG. 2) and the message processor 108 within the Computer C will send the activity message to the Computers A-B.

The activity messages received by Computers A-C are processed by the message processor 108. As soon as an activity message is received, the message processor 108 generates an activity indicator and displays it on the display 36. The activity indicator may take the form of a text indicator 124, as illustrated on the display 36 of the Computer A. Alternatively, the display indicator may take the form of a graphic icon 126, as illustrated on the display 36 of the Computer C. The activity indicator may also be a combination of graphic icon and text indicator.

The computer receiving the activity message must independently determine when another participant is no longer actively entering data via the user input device 102. Although it is possible for a computer to transmit a status message indicating inactivity, such a status message is undesirable because it increases the traffic volume on the computer network to transmit periodic messages indicating that nothing is happening. Furthermore, if a status message is not received, it may be due to the fact that the computer is no longer coupled to the network and is thus unable to transmit status messages. Therefore, the present invention provides a technique in which a recipient computer independently measures the time interval from the receipt of the last activity message and will assume that a user is no longer active if a new activity message is not received within a predetermined time interval. Returning again to FIG. 2, the message processor 108 also resets one of the timers 106 upon receipt of an activity message. The timer 106 is set to measure a second predetermined time interval and can be reset to measure a new time interval when an activity message is received.

Those skilled in the art will appreciate that timer functions may vary from one system to another. For example, the Windows® operating system allows the user to select a time interval and continuously measure the selected time interval until halted by the user. Each time the time interval expires, the operating system generates a signal, such as an interrupt, and restarts the time interval measurement. With a timer of this sort, the system 100 simply starts a timer to measure the second predetermined time interval. If a new activity message is not received before the expiration of the second predetermined time interval, the message processor 108 will delete the activity indicator from the display 36. For example, the timer 106 may measure a six second time interval. The message processor 108 will delete the activity indicator from the display 36 at the end of the six second time interval unless a new activity message is received. In the example described above, in activity message than is generated and transmitted every five seconds (i.e., the first predetermined time interval). So long as the user is actively entering data, an activity message is transmitted every five seconds and thus received just before the expiration of the six second time interval. Those skilled in the art will appreciate that the system 100 is not limited to the time periods presented in the examples above. The five second and six second time intervals measured by the timer 106 may be set to other convenient values. Although the first and second predetermined time intervals may be set to any values, it is convenient to make the second predetermined time interval longer than the first predetermined time interval so that the message processor 108 in the receiving computer need only generate the activity indicator once for the display 36 and need only delete the activity indicator once if a new activity message is not received within the second predetermined time interval. This reduces the number of instructions it must be executed by the message processor 108.

Alternatively, the message sender can define the second predetermined time interval by sending timer data with the text message and/or with an activity message. The system 100 can set the timer 106 based on the received timer data thus allowing remote programmability of the time intervals.

Figure 4A:
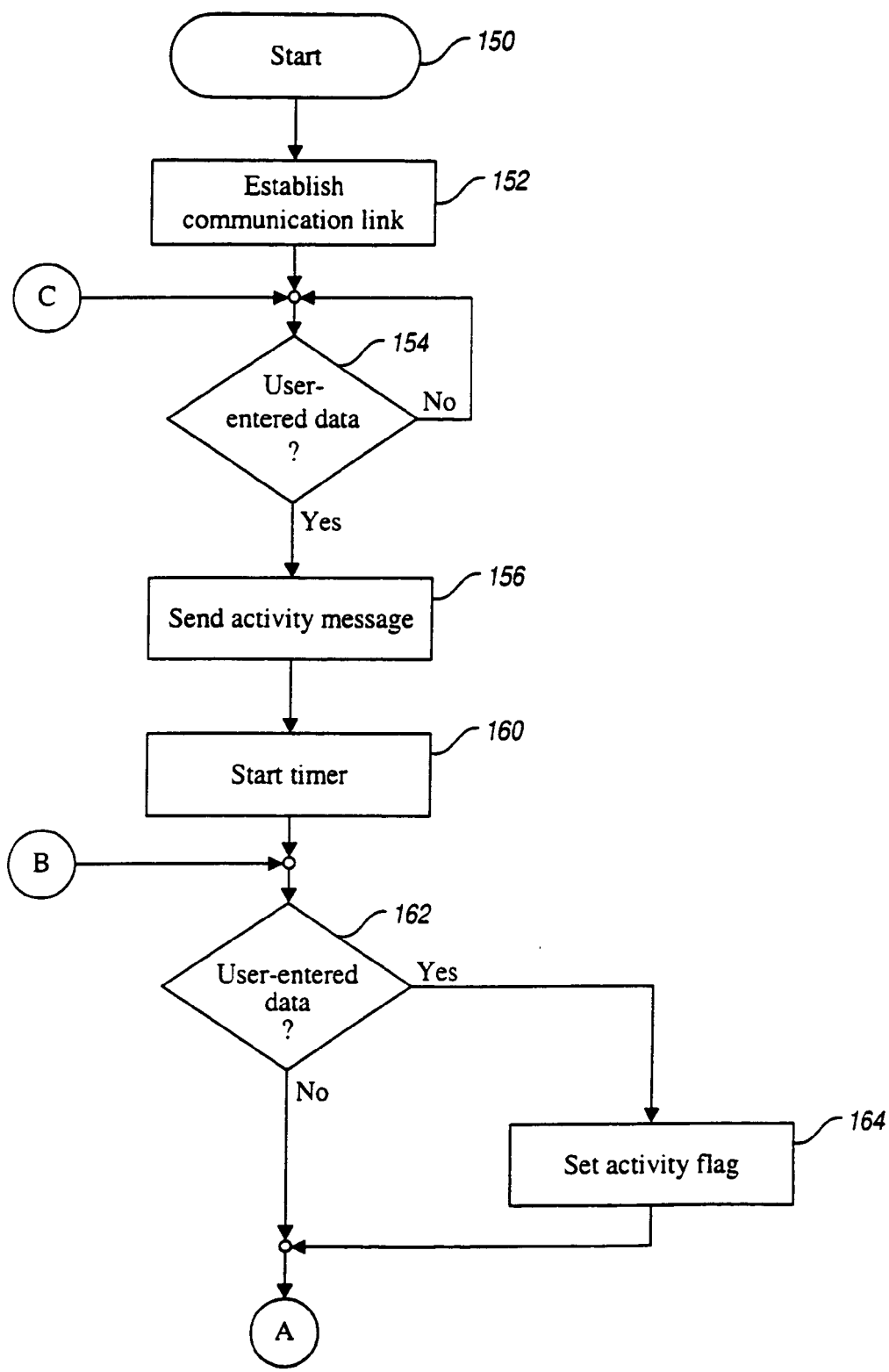
FIGS. 4A and 4B together form a flowchart illustrating the operation of the system to monitor user input and to generate and transmit a user activity message.
Figure 4B:
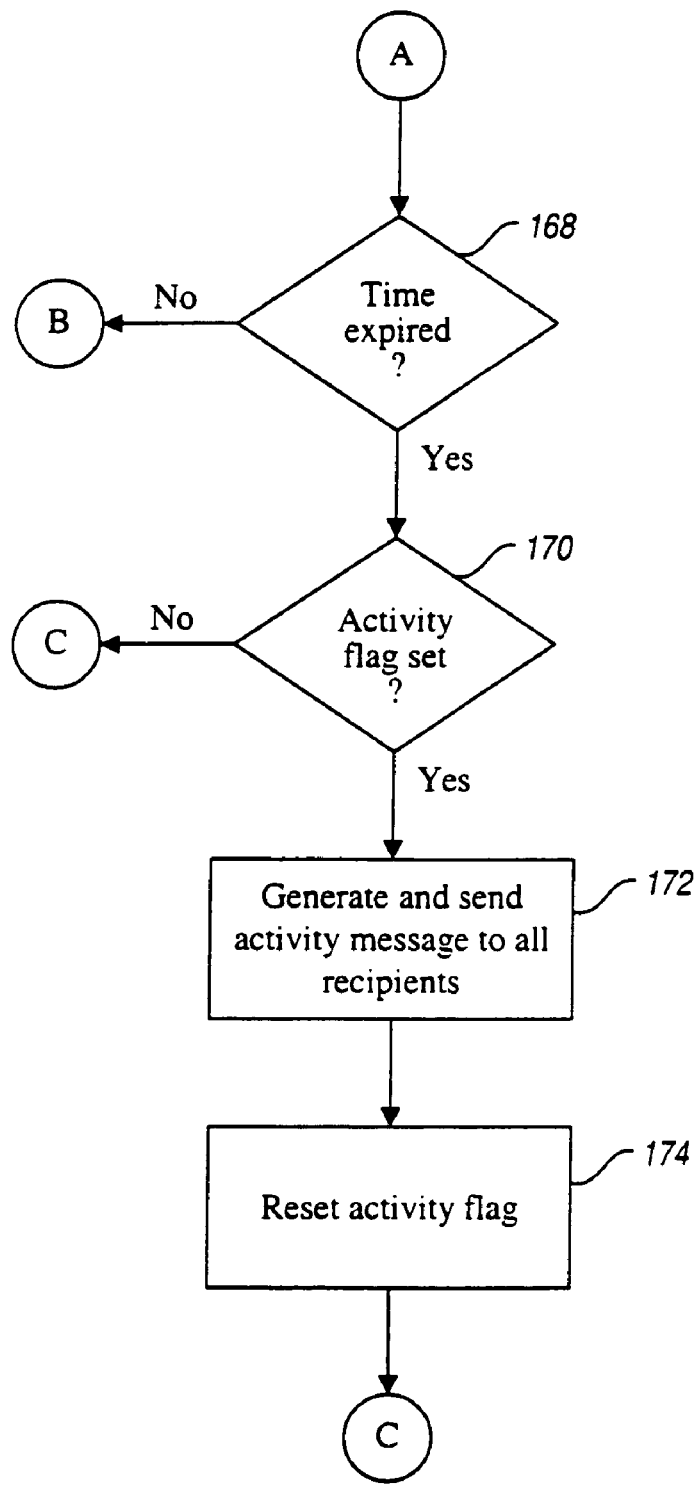

Operation of the system 100 to generate and transmit activity messages is illustrated in the flowchart of FIGS. 4A and 4B. At a start 150, it is assumed that multiple users wish to engage in an instant messaging session. In step 152, a communication link is established between the participants. As illustrated in FIG. 3, multiple computers are coupled to each other and thereby establish communication link via the computer network 120. The Internet is a well-known example of the computer network 120. The process of establishing the communication link between participants in via the computer network 120 is well-known and need not be described herein.

In decision 154, the system 100 detects the entry of user data via the user input device 102 (see FIG. 2). If the user has not entered any user data, the result of decision 154 is NO. In that event, the system returns to decision 154 to await the user entry of data. If the user has entered data via the user input device 102, the result decision 154 is YES and, in step 156 the message processor 108 generates and transmit an activity message to the other participants in the instant messaging session. It is not necessary to send an immediate activity message as soon as user activity is detected. Thus, decision 154 and step 156 are optional.

In the example illustrated in FIG. 3, the message processor 108 in the Computer A will generate an activity message if the user of the Computer A is typing a message on the keyboard 37. The activity message is transmitted via the computer network 120 to the Computers B-C. The message processors 108 in the Computers B-C each process the activity message from the Computer A and generate an activity indicator, such as the text indicator 124 on the display 36 of the Computer B and the graphic icon 126 on the display of the Computer C.

Following transmission of the activity message, the system 100 starts one of the timers 106 in step 160 to measure the first predetermined time interval. In the example described above, the message processor 108 in the computer A starts the timer 106 to measure a five second time interval. During the first predetermined time interval, the system 100 monitors for additional user-entered data. In decision 162, system determines whether the user has entered any additional data. If the user has entered additional data, the result of decision 162 is YES and, in step 164, the system 100 sets in activity flag to indicate the user entry of additional data.

If the user has not entered additional data, the result decision 162 is NO. If no additional data has been entered, or following the execution of step 164 to set the activity flag, the system 100 moves to decision 168, shown in FIG. 4B. In decision 168 the system 100 determines whether the first predetermined time interval has elapsed. If the first predetermined time interval has not elapsed, the result decision 168 is NO. In that event, the system 100 returns to decision 162 in FIG. 4A to test again for the detection of user-entered data.

If the first predetermined time interval has elapsed, the result of decision 168 is YES and the system 100 moves to decision 170 to determine whether the activity flag has been set. If the activity flag has not been set, the result of decision 170 is NO. In that event, the system 100 will not generate an activity message, but simply returns to decision 154 in FIG. 4A to await the entry of user-entered data. As previously discussed, the timer (e.g., the timer 106) on some systems continuously measure a predetermined time period (e.g., the first predetermined time period) and do not require restarting of the timer. In that event, the system 100 may return to decision 162 in FIG. 4A to detect user-entered data in the next sequential time interval.

If the activity flag has been set, the result decision 170 is YES thus indicating that user activity has occurred within the first predetermined time interval. In that event, the message processor 108 (see FIG. 2) generates an activity message in step 172 and transmits the activity message to all participants in the instant messaging session.

As can be appreciated by those skilled in the art, the system 100 must keep track of all participants in the instant messaging session. However, these techniques are known in the art and need not be described herein. Current technology allows the user to communicate with one or more other participants in an instant messaging session by placing the name(s) of the participants on a "contact" list. Once the name(s) of participants have been placed on a contact list for the current instant messaging session, all messages, including text messages and activity messages generated by the system 100, will be transmitted to all participants in the instant messaging session. Obviously, it is not necessary for the system 100 to transmit an activity message to itself or to display an activity indicator to show its own user's activities. Thus, in step 172, the message processor 108 generates and sends an activity message to all other participants in the instant messaging session. In step 174, the system 100 resets the activity flag and moves to decision 154 in FIG. 4A to await the detection of additional user-entered data. Alternatively, the system 100 can return to decision 162 in FIG. 4A if the timer continuously measures the first predetermined time interval. In this manner, the system 100 monitors the user input device 102 (see FIG. 2) and automatically sends periodic activity messages to the other participants in an instant messaging session.

Figure 5:
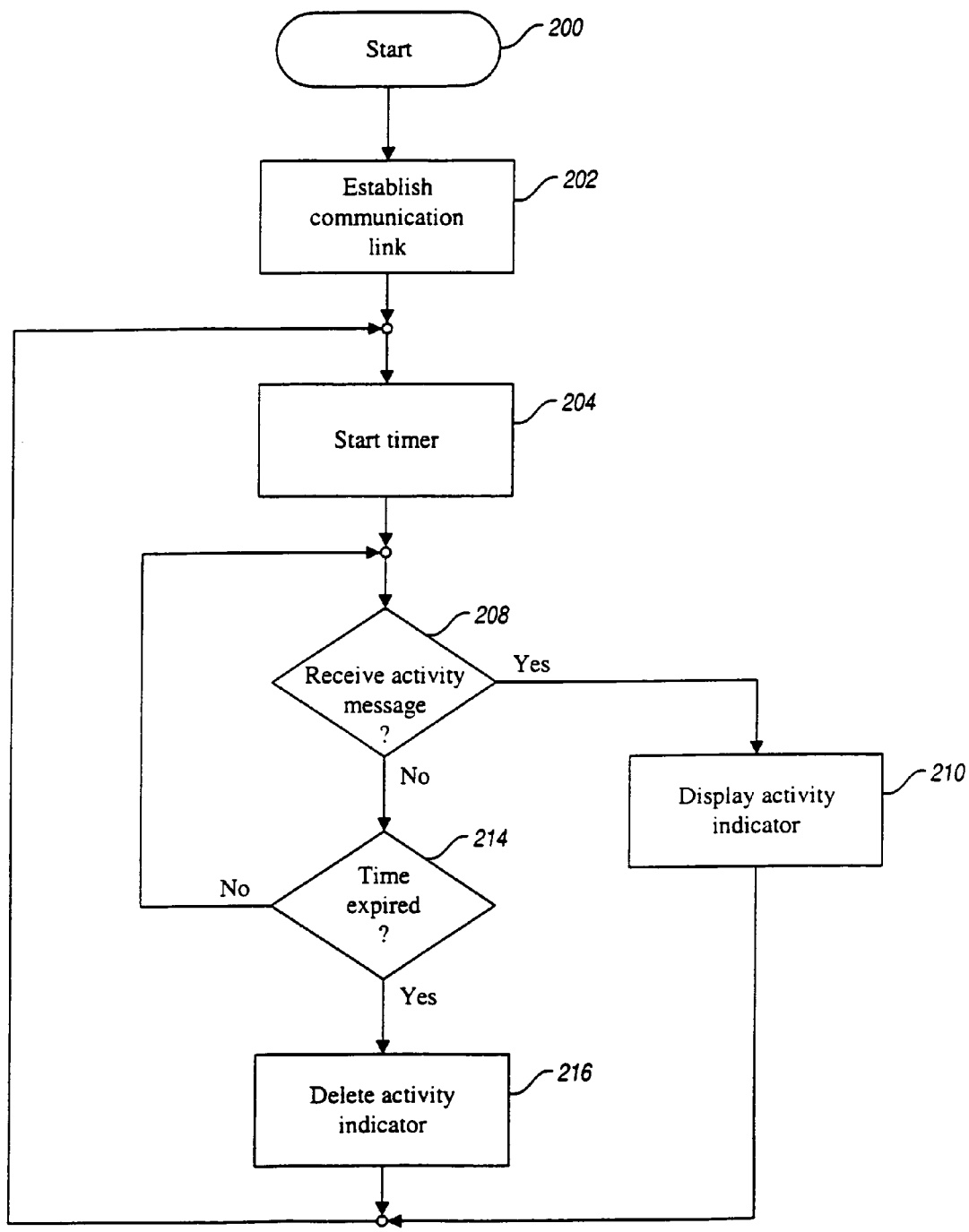
FIG. 5 is a flowchart illustrating the operation of the system to receive and process user activity messages.

The operation of the system 100 when receiving activity messages is illustrated in the flowchart of FIG. 5. At a start 200, it is assumed that multiple users wish to communicate with each other in an instant messaging session. In step 202, the computer 20 (e.g., the Computer B in FIG. 3) establishes a communication link with the other computers (e.g., the Computers A-C) participating in the instant messaging session.

In step 204, the system 100 starts one of the timers 106 (see FIG. 2) to measure the second predetermined time interval. As previously discussed, the first and second predetermined time intervals may be set to any values. However, as noted above, is convenient to set the second predetermined time interval to a value greater than the first predetermined time interval. In decision 208, the system determines whether an activity message has been received from any participant in the instant messaging session.

If an activity message has been received, the result decision of 208 is YES. In that event, in step 210, the system 100 displays an activity indicator, such as the indicator 124 or the graphic icon 126 on the display 36. In the example described above where the user of the Computer A this typing a message on the keyboard 37, the message processor 108 in the Computer A transmits an activity message to the Computers B-C, which each display an activity indicator on their respective display 36.

Following display of the activity indicator in step 210, system 100 returns to step 204 and restarts the timer to measure the second predetermined time interval once again. If the system 100 has not received an activity message, the result of decision 208 is NO. In an event, the system 100 moves to decision 214 to determine whether the second predetermined time interval has elapsed. If the second predetermined time interval has not elapsed, the result decision 214 is NO and the system returns to decision 208 to await the receipt of an activity message. If the second predetermined time interval has elapsed, the result of decision 214 is YES. In that event, the system 100 moves to decision 216 and deletes the activity indicator from the display 36.

The flowchart of FIG. 5 provides an example implementation of the system, but is not intended as the only possible implementation. For example, the timers may run continuously, as described above. In this embodiment, the system 100 continuously measures the second predetermined time interval. At the end of the time interval, the system deletes activity indicators for those individual(s) from whom an activity message was not received. If an activity message is received from a new participant, the system 100 can display the activity indicator for the new participants immediately or at the end of the second predetermined time interval.

It should be noted that a given computer may receive an activity message from more than one participant in the instant messaging session. For example, if the users of the Computers A-B (see FIG. 3) are both entering data via their respective user input devices 102 (see FIG. 2), both computers will send activity messages to the other participants in the instant messaging session. In this example, the message processor 108 of the Computer A receives an activity message indicating that the user of the Computer B is actively entering data, the message processor 108 of the Computer B receives an activity message indicating that the user of the Computer A is actively entering data, and the message processor 108 of the Computer C receives activity messages from both Computers B-C. Because the Computers A-B operate independently, their respective message processors 108 may transmit activity messages at different times and, thus, the Computer C does not receive activity messages from both computers at the same time. The system 100 must have a sufficient number of timers 106 to measure the first predetermined time interval for its own user activity and a timer to measure the second predetermined time interval for each of the other participants in the instant messaging session to allow the deletion of activity indicators from participants from whom an activity message has not been received during the previous second predetermined time interval. Alternatively, the system 100 can continuously measure the second predetermined time interval, as described above, and alters the activity indicators for all other participants based on whether activity messages were received from any or all of the participants in the instant messaging session.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for indicating user input activity comprising:
 a first electronic device for receiving an activity indication message indicative of a user having operated, within a predefined period of time, an input device associated with a second electronic device remote from said first electronic device;
 an activity indicator that is rendered to indicate that said user is currently operating said input device;
 a content message received from said second electronic device, said content message comprising information entered by said user using said input device, and wherein it is determined whether said user has stopped typing based on receipt of said content message, and wherein said activity indicator ceases to render based on said determining.

2. The system of claim 1, wherein said input device comprises a keyboard.

3. The system of claim 1, wherein said first electronic device is associated with a visual display device, and wherein said act of rendering an activity indicator comprises displaying a graphic image or text string on said visual display device.

* * * * *